_United States Patent Office_

3,218,319
Patented Nov. 16, 1965

3,218,319
HETEROARYLOXYALKYLAMINOALKYL TERTIARY AMINES, AND THEIR ACID ADDITION SALTS
Elzina G. van Proosdij-Hartzema, Hilversum, and Geertruida C. van Leeuwen and Antony M. Akkerman, Amsterdam, Netherlands, assignors to N.V. Nederlandsche Combinatie voor Chemische Industrie, Amsterdam, Netherlands, a limited liability company of the Netherlands
No Drawing. Filed July 25, 1962, Ser. No. 212,455
Claims priority, application Great Britain, Nov. 20, 1961, 41,396/61; June 7, 1962, 22,101/62
9 Claims. (Cl. 260—247.5)

This invention relates to new heteroaryloxyalkylaminoalkyl tert. amines, and their acid addition salts.

It has been found that compounds, and the acid addition salts of compounds represented by the formula:

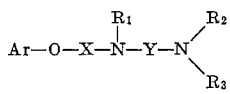

in which:

Ar is an heteroaromatic radical selected from the class consisting of pyridyl, pyrazyl and thienyl, X and Y are either straight or branched alkylene chains consisting of from 2 to 4 carbon atoms, $R_1$ is a member selected from the group consisting of hydrogen and lower alkyl groups, and $R_2$ and $R_3$ are lower alkyl groups which may be linked to form with the nitrogen atom to which they are attached a basic heterocyclic radical, such as, 4-morpholinyl or 1-piperidyl, are valuable antitussive agents. No undesirable side-effects have been noted. These antitussive agents are especially valuable because of the absence of analgesic properties and local anesthetic effects when employed in active dosages. Most valuable are the compounds in which

represents a 4-morpholinyl group.

Various methods previously used for the preparation of analogous compounds are applicable to the manufacture of compounds embodying the present invention. The most convenient method is the reaction of a heteroarylhalide with the alkali-metal compound of a tertiary amino alkyl-aminoalkanol.

Compounds, in which $R_1$ is a lower alkyl group, can be prepared by alkylation of the corresponding secondary amines by either of the following methods:

(1) Addition of a lower aliphatic carbonyl compound to the secondary amine and reduction of the adduct. Suitable reducing agents are formic acid or catalytic hydrogen.

(2) Conversion of the secondary amine into an amide by reaction with a suitable lower alkanoyl acylating agent, followed by reduction of the amide grouping, for example, with lithium aluminum hydride.

The following examples serve to specifically illustrate the methods by which compounds according to the invention can be prepared, but it is to be understood that the invention is not restricted to the examples.

*Example I*

To a mechanically stirred suspension of 4 grams of sodium amide in 100 ccs. of dry toluene there are added 17.4 grams of 2-(2-morpholinoethylamino)ethanol. The mixture is refluxed for two hours. Then, 15.8 grams of 2-bromopyridine are added and refluxing is continued for 18 hours. After cooling, 1 cc. of ethanol, followed by 20 ccs. of water, are added. The aqueous layer is extracted repeatedly with toluene. The combined toluene solutions are dried over magnesium sulphate and fractionated in vacuo. The 2-[2-(2-morpholinoethylamino)ethoxy]pyridine thus obtained distills at 170°–178° C./1 mm. mercury pressure. $n_D^{22}=1.5238$. The dihydrochloride melts at 177°–178° C. A 22% yield is obtained.

*Example II*

A mixture of 3.24 grams of 2-[2-(2-morpholinoethylamino)ethoxy]pyridine dihydrochloride, 1.36 grams of sodium formate, 5 ccs. of formic acid (98%) and 4.7 ccs. of an aqueous formaldehyde solution (36%) is heated for about 30 minutes over a steambath while being stirred, until the evolution of carbon dioxide has ceased. The cooled solution is made strongly alkaline by addition of a concentrated potassium hydroxide solution and extracted repeatedly with benzene.

The extract is dried, the solvent removed by distillation and the residue dissolved in ethanol. After adding ethanolic hydrogen chloride, there is obtained a 42% yield of white crystals of 2-[2-(N-methyl-2-morpholinoethylamino)ethoxy]pyridine dihydrochloride, having a melting point of 180°–182° C.

*Example III*

A mixture of 6.1 grams of 2-[2-(2-morpholinoethylamino)ethoxy]pyridine and 30 ccs. of acetic anhydride is refluxed for 1½ hours. After cooling, the solution is poured onto ice, then neutralized with sodium hydrogen carbonate, and the 2-[2-(N-acetyl-2-morpholinoethylamino)ethoxy]pyridine is collected by extraction of the mixture with benzene. The hydrochloric acid salt of this compound melts at 172°–173° C.

The benzene solution is diluted with an equal volume of diethyl ether and subsequently added dropwise to a solution of 1 gram lithium aluminum hydride in 75 ccs. of diethyl ether. The reaction-mitxure is stirred while being refluxed for 7 hours. After cooling, 4 ccs. of water are added, the solid is filtered with the aid of "Hyflo," and washed twice with hot benzene. The filtrate is processed as usual, and the reaction product is secured as the dihydro chloride. The 2-[2-(N-ethyl-2-morpholinoethylamino)ethoxy]pyridine dihydrochloride thus obtained melts at 175°–176° C., and a yield of 40% is achieved.

*Example IV*

In the same way as described in Example I, however, starting from 2-(3-morpholinopropylamino)ethanol instead of from 2-(2-morhpolinoethylamino)ethanol as above, a 35% yield of 2-[2-(3-morpholinopropylamino)ethoxy]pyridine dihydrochloride having a melting point of 189°–190° C., is obtained.

*Example V*

In the same way as described in Example I, however, using 2-bromopyrazine instead of the 2-bromopyridine as above, a 20.6% yield of 2-[2-(2-morpholinoethylamino)ethoxy]pyrazine dihydrochloride, having a melting point of 176°–178° C., is obtained.

*Example VI*

In the same way as described in Example II, however, starting from 2-[2-(2-morpholinoethylamino)ethoxy]pyrazine dihydrochloride instead of from the corresponding pyridine derivative, as above, a 76% yield of 2-[2-(N-methyl-2-morpholinoethylamino)ethoxy]pyrazine dihydrochloride, having a melting point of 209°–210° C., is obtained.

Example VII

In the same way as described in Example I, however, starting from 2-(2-piperidinoethylamino)ethanol, instead of from the corresponding morpholino derivative, as above, a 43% yield of 2-[2-(2-piperidinoethylamino)ethoxy]pyridine dihydrochloride, having a melting point of 207°–208° C., is obtained.

Example VIII

In the same way as described in Example II, however, starting from 2-[2-(2-piperidinoethylamino)ethoxy]pyridine dihydrochloride instead of from the corresponding morpholino derivative, as above, a 67% yield of 2-[2-(N-methyl-2-piperidinoethylamino)ethoxy]pyridine dihydrochloride, having a melting point of 208°–210° C., is obtained.

Example IX

In the same way as described in Example I, however, starting from N,N-dimethyl-N'-(2-hydroxyethyl)ethylenediamine instead of from 2-(2-morpholinoethylamino)ethanol, as above, a 25% yield of N,N-dimethyl-N'-[2-(2-pyridyloxy)ethyl]ethylenediamine dihydrochloride, having a melting point of 170°–171° C., is obtained.

Example X

In the same way as described in Example II, however, starting from N,N-dimethyl-N'[2-(2-pyridyloxy)ethyl]ethylenediamine dihydrochloride instead of from 2-[2-(2-morpholinothylamino)ethoxy]pyridine dihydrochloride, as above, a 42% yield of N,N,N'-trimethyl-N'-[2-(2-pyridyloxy)ethyl]ethylenediamine dihydrochloride, having a melting point of 182°–183° C., is obtained.

Example XI

In the same way as described in Example I, however, starting from N,N-diethyl-N'-(2-hydroxyethyl)ethylenediamine instead of from 2-(2-morpholionethylamino)ethanol, as above, a 42% yield of N,N-diethyl-N'-[2-(2-pyridyloxy)ethyl]ethylenediamine dihydrochloride, having a melting point of 127°–128° C., is obtained.

Example XII

In the same way as described in Example II, however, starting from N,N - diethyl-N'-[2-(2-pyridyloxy)ethyl]ethylenediamine dihydrochloride instead of from 2-[2-(2-morpholinoethylamino) ethoxy]pyridine dihydrochloride, as above, a 52% yield of N,N-diethyl-N'-methyl-N'-[2-(2 - pyridyloxy)ethyl]ethylenediamine dihydrochloride, having a melting point of 144°–146° C., is obtained.

What is claimed is:

1. A compound of the group consisting of compounds having the formula:

$$Ar-O-X-N-Y-N\begin{matrix}R_2\\|\\R_1\end{matrix}\begin{matrix}\\\\R_3\end{matrix}$$

in which
Ar is selected from the group consisting of pyridyl and pyrazyl,
X and Y are selected from the group consisting of straight and branched alkylene chains of from 2 to 4 carbon atoms,
$R_1$ is selected from the group consisting of hydrogen and lower alkyl, and
$R_2$ and $R_3$ are selected from the group consisting of lower alkyl and together with the nitrogen atom form a member selected from the group consisting of morpholino and piperidino; and acid addition salts thereof.

2. 2-[2-(2-morpholinoethylamino)ethoxy]pyridine.
3. Acid addition salts of 2-[2-(2-morpholinoethylamino)ethoxy]pyridine.
4. 2-[2-(2-morpholinoethylamino)ethoxy]pyrazine.
5. Acid addition salts of 2-[2-(2-morpholinoethylamino)ethoxy]pyrazine.
6. N,N - dimethyl - N' - [2-(2-pyridyloxy)ethyl]ethylenediamine.
7. Acid addition salts of N,N - dimethyl - N' - [2-(2-pyridyloxy)ethyl]ethylenediamine.
8. 2 - [2 - (N - ethyl-2-morpholinoethylamino)ethoxy]pyridine.
9. Acid addition salts of 2-[2-(N-ethyl-2-morpholinoethylamino)ethoxy]pyridine.

References Cited by the Examiner

UNITED STATES PATENTS 2,626,262  1/1953  Lott et al. _____ 260—296

FOREIGN PATENTS 832,250  4/1960  Great Britain.

NICHOLAS S. RIZZO, *Primary Examiner.*